(No Model.)
S. WATERMAN & C. H. LUTHER, Jr.
VELOCIPEDE.
No. 492,754. Patented Feb. 28, 1893.
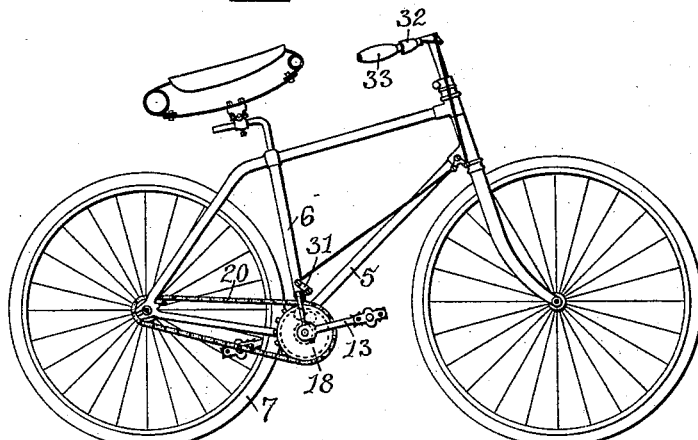
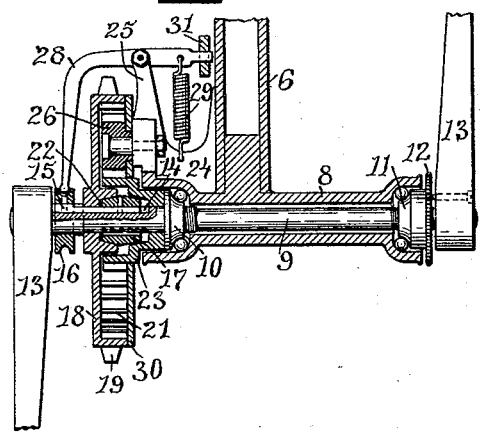
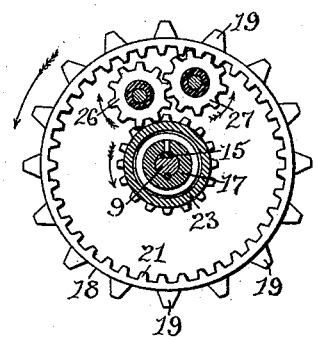

UNITED STATES PATENT OFFICE.

STEPHEN WATERMAN AND CHARLES H. LUTHER, JR., OF PROVIDENCE, RHODE ISLAND, ASSIGNORS TO THEMSELVES, AND KENNETH LEE, OF NEW YORK, N. Y.

VELOCIPEDE.

SPECIFICATION forming part of Letters Patent No. 492,754, dated February 28, 1893.

Application filed August 24, 1892. Serial No. 443,974. (No model.)

*To all whom it may concern:*

Be it known that we, STEPHEN WATERMAN and CHARLES H. LUTHER, Jr., both of the city of Providence, in the county of Providence and State of Rhode Island, have invented certain new and useful Improvements in Velocipedes; and we hereby declare that the following is a full, clear, and exact description of the same, reference being had to the accompanying drawings, forming part of this specification.

This invention has reference to improvements in speed-changing devices which are particularly applicable to velocipedes of the bicycle type.

The object of this invention is to produce an attachment for a velocipede by which the speed at which the driving-wheel is operated is diminished and the power exerted on the same changed in a corresponding degree.

Another object of the invention is to provide a velocipede with a speed-changing device adapted to be operated by a movement of the rider's foot or through a system of connecting rods and a handle located in a convenient position.

The invention consists in the peculiar construction of the sprocket driving-drum and the combination therewith of a clutch and a system of compound gearing adapted to be connected with and disconnected from the sprocket-drum.

The invention also consists in the peculiar and novel device for operating the clutch to change the speed and power exerted on the drive-wheel.

Figure 1 represents a side view of a two-wheel velocipede provided with our improved speed-changing device. Fig. 2 represents a sectional view through the crank-shaft bearing showing the inner construction of the sprocket driving-drum and the means for connecting the same directly to the crank-shaft or for connecting through the compound gearing. Fig. 3 represents a face view of the sprocket-drum and the internal gearing, the central gear and the clutch being shown in section.

Similar numbers of reference designate corresponding parts throughout.

In the drawings 5 indicates a lower stay of a bicycle or velocipede frame, and 6 is an upright stay; at the juncture of these stays with the lower brace of the drive-wheel 7 is secured a transverse-sleeve 8 through which the crank-shaft 9 extends,—this sleeve is provided with enlarged ends in which the slightly-concaved shoulders 10 and 11, secured to the shaft 9, are journaled in ball-bearings, the bearing of the shaft being adjusted by means of the thumb-nut 12 and the shoulder 11,—on the outer ends of the shaft 9 are secured the usual cranks 13—13.

The end of the crank-shaft on which the sprocket-drum is carried has a longitudinal-slot 14 in which the slide 15 is free to reciprocate, on the outer end of the slide is secured the grooved pulley 16 and on the inner end of the slide is fastened the double-clutch 17 which may be of any ordinary construction but is here shown as a simple friction-clutch.

The sprocket-drum 18 is mounted on the crank-shaft 9 intermediate the pulley 16 and the clutch is free to rotate on the shaft but is held from longitudinal movement by a shoulder on the outer portion of the shaft. The sprocket-drum is furnished on its outer circumference with the studs 19 to engage the links of the continuous drive-chain 20 which also passes around a small sprocket-disk secured to the axle of the drive-wheel 7,—the sprocket-drum 18 is furnished on the inner surface of its circumferential-flange with the internal-gear 21 and the central portion is thickened to form a hub in the inner surface of which is formed a friction-cavity 22 or other means with which the clutch 17 may engage.

Loosely mounted on the crank-shaft 9 is a central hollow-gear 23 the hub of which is furnished with means by which it may be engaged by the clutch 17 as it is moved inward on the crank-shaft. The sleeve 8 has an upwardly-projecting member 24 furnished with the arm 25 and in this member are secured studs on which are journaled the pinions 26 and 27 by which motion is conveyed from the central-gear 23 to the internal-gear 21 of the sprocket-drum.

Pivoted to the upper end of the arm 25 is a bent lever 28 which has a bearing-finger at its lower end which enters the groove in the pulley 16, by the movement of this lever the clutch 17 is moved back and forth on the crank-shaft and is engaged with the sprocket-drum to drive the same directly from the crank-shaft, or is engaged with the central-gear to connect the same to the crank-shaft and to drive the sprocket-drum through the pinions 26 and 27,—a spring 29 is sometimes used to hold the upper end of the lever down and to keep the clutch in engagement with the hub of the sprocket-drum, and a circular-disk 30, having perforations through which the base portions of the gears 26 and 27 extend, is provided to close the open side of the drum.

The bent-lever 28 may be operated in any suitable manner, but we prefer to connect the upper end of the same to a bell-crank 31 which is pivoted to the upright-brace 6, this in turn being connected by a system of connecting-rods and bell-cranks with a handle 32 pivoted to the ordinary handle-bar 33 of the velocipede and in a convenient position to be grasped by the rider.

It will be readily apparent that when the sprocket-drum is connected by means of the clutch with the crank-shaft, the driving-wheel 7 will be driven at a greater speed than that at which the cranks are moving owing to the sprocket-drum being of greater diameter than the sprocket-disk on the drive-wheel axle,—if, however, it is desired to diminish the speed of the drive-wheel and to increase the power exerted thereon, a simple movement will throw the clutch into engagement with the central-gear 23, and the sprocket-drum, while being driven at a less speed, will have increased power through the gears 26 and 27.

Having thus described our invention, we claim as new and desire to secure by Letters Patent—

1. In a velocipede, the combination with the crank-shaft, a sprocket-drum loosely journaled thereon having an internal circumferential-gear and carrying a drive-chain, of a central-gear having a clutch cavity also loosely journaled on the crank-shaft, intermediate pinions suitably journaled and adapted to convey the movement of the central-gear to the internal-gear of the drum, and a longitudinally movable clutch for connecting the central-gear and the crank-shaft.

2. In a velocipede, the combination with a crank-shaft a sprocket-drum, loosely mounted thereon, having a central clutch cavity and an internal gear, and means for conveying motion of the drum to a drive-wheel, of a gear independently rotatable on said shaft, and having a central clutch cavity means for conveying motion from the gear to the internal gear of the sprocket-drum, a clutch contained between the central-gear and the sprocket-drum, and means for operating the same to alternately connect the sprocket-drum and the central-gear to the crank-shaft.

3. The combination with a sleeve 8 suitably supported and having the member 24 furnished with the arm 25, the crank-shaft 9 journaled in said sleeve and having a longitudinal-groove 14, a slide 15 movable in said groove, the grooved-pulley 16 secured to the outer end of said slide, the double friction-clutch 17 secured to the inner end of the slide, the sprocket-drum 18, having the internal-gear 21 and a central friction-cavity, independently rotatable on the crank-shaft, and a lever engaging in the groove of the pulley 16 and adapted to move the same longitudinally of the shaft, of the central-gear 23 having a friction-cavity and also loosely journaled on the crank-shaft, the pinion 26 journaled on a shaft secured to the member 24 and engaging with the central-gear, the pinion 27 also journaled on a shaft secured to the member 24 and engaging with the pinion 26 and with the internal-gear 21 of the sprocket-drum, and a suitable disk for closing the open side of the drum, as and for the purpose described.

In witness whereof we have hereunto set our hands.

STEPHEN WATERMAN.
CHARLES H. LUTHER, Jr.

Witnesses:
HENRY J. MILLER,
M. F. BLIGH.